(12) United States Patent
Ishida et al.

(10) Patent No.: US 8,413,379 B2
(45) Date of Patent: Apr. 9, 2013

(54) STEP UNIT

(75) Inventors: Toshihiko Ishida, Niwa-gun (JP);
Tsutomu Takeuchi, Gamagori (JP)

(73) Assignee: Aisin Seiki Kabushiki Kaisha,
Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/510,146

(22) PCT Filed: Nov. 17, 2010

(86) PCT No.: PCT/JP2010/070507
§ 371 (c)(1),
(2), (4) Date: May 16, 2012

(87) PCT Pub. No.: WO2011/062201
PCT Pub. Date: May 26, 2011

(65) Prior Publication Data
US 2012/0222914 A1    Sep. 6, 2012

(30) Foreign Application Priority Data
Nov. 20, 2009    (JP) ................................. 2009-265149

(51) Int. Cl.
*B60J 5/06*    (2006.01)
(52) U.S. Cl.
USPC ............. 49/216; 280/164.1; 182/90; 296/155
(58) Field of Classification Search ..................... 49/213, 49/216; 296/155; 280/163, 164.1; 292/90
See application file for complete search history.

(56) References Cited

U.S. PATENT DOCUMENTS

| 3,935,674 | A | * | 2/1976 | Williams et al. | ................ | 49/212 |
| 5,286,049 | A | * | 2/1994 | Khan | ............................ | 280/163 |
| 5,316,365 | A | * | 5/1994 | Kuhlman et al. | ............. | 296/155 |

(Continued)

FOREIGN PATENT DOCUMENTS

| JP | 59-171181 U | 11/1984 |
| JP | 4-062285 A | 2/1992 |

(Continued)

OTHER PUBLICATIONS

International Search Report (PCT/ISA/210) issued on Feb. 15, 2011, by the Japanese Patent Office as the International Searching Authority for International Application No. PCT/JP2010/070507.

(Continued)

*Primary Examiner* — Jeffrey J Restifo
*Assistant Examiner* — Erez Gurari
(74) *Attorney, Agent, or Firm* — Buchanan Ingersoll & Rooney PC

(57) ABSTRACT

A step unit includes: a step member which is provided with a pair of lower rails extending in an opening and closing direction of a slide door of the vehicle; and a rail plate member which is provided to a cutout formed in a part of either of the lower rails and which continuously connects the lower rails in the opening and closing direction. The step member is molded using a resin material and is provided with an insertion hole which vertically penetrates through the step member at a position corresponding to the cutout; and a support extension section which is extended from a side end of the cutout of the lower rail. The rail plate member is mounted to the step member by being inserted so as to penetrate through the insertion hole from above the step member.

6 Claims, 6 Drawing Sheets

U.S. PATENT DOCUMENTS

| | | | | |
|---|---|---|---|---|
| 5,992,097 | A * | 11/1999 | Makiuchi et al. | 49/216 |
| 6,036,257 | A * | 3/2000 | Manuel | 296/155 |
| 6,161,894 | A * | 12/2000 | Chapman | 296/155 |
| 6,328,374 | B1 * | 12/2001 | Patel | 296/155 |
| 6,926,295 | B2 * | 8/2005 | Berkebile et al. | 280/166 |
| 6,932,417 | B2 * | 8/2005 | Barczynski et al. | 296/155 |
| 7,287,805 | B2 * | 10/2007 | Yamada et al. | 296/155 |
| 7,325,361 | B2 * | 2/2008 | Rogers et al. | 49/360 |
| 7,413,204 | B2 * | 8/2008 | Leitner | 280/163 |
| 7,413,205 | B2 * | 8/2008 | Watson | 280/166 |
| 7,441,790 | B2 * | 10/2008 | Lechkun | 280/166 |
| 7,575,270 | B2 * | 8/2009 | Nagai et al. | 296/155 |
| 7,607,674 | B2 * | 10/2009 | Watson | 280/166 |
| 7,621,546 | B2 * | 11/2009 | Ross et al. | 280/166 |
| 7,887,118 | B2 * | 2/2011 | Elliott et al. | 296/155 |
| 7,997,639 | B2 * | 8/2011 | Yokomori et al. | 296/155 |
| 8,152,221 | B2 * | 4/2012 | Yoshioka | 296/155 |
| 8,225,552 | B2 * | 7/2012 | Yokomori et al. | 49/360 |
| 2002/0195792 | A1 * | 12/2002 | Hendrix | 280/164.1 |
| 2005/0062313 | A1 * | 3/2005 | Barczynski et al. | 296/155 |
| 2006/0267375 | A1 * | 11/2006 | Enomoto | 296/155 |
| 2006/0284447 | A1 * | 12/2006 | Sato | 296/155 |
| 2007/0085374 | A1 * | 4/2007 | Mather et al. | 296/155 |
| 2007/0096504 | A1 * | 5/2007 | Kothe et al. | 296/155 |
| 2007/0278822 | A1 * | 12/2007 | Mueller | 296/155 |
| 2009/0121449 | A1 * | 5/2009 | Kuntze et al. | 280/163 |
| 2012/0222914 | A1 * | 9/2012 | Ishida et al. | 182/90 |

FOREIGN PATENT DOCUMENTS

| | | |
|---|---|---|
| JP | 8-312247 A | 11/1996 |
| JP | 10-315776 A | 12/1998 |
| JP | 2000-345760 A | 12/2000 |
| JP | 2009-161113 A | 7/2009 |

OTHER PUBLICATIONS

Repair Manual for Toyota Alphard Vellfire, vol. F, May 2008 (DH-282 through DH-285, Dh-244 through DH-247 and one other page).

* cited by examiner

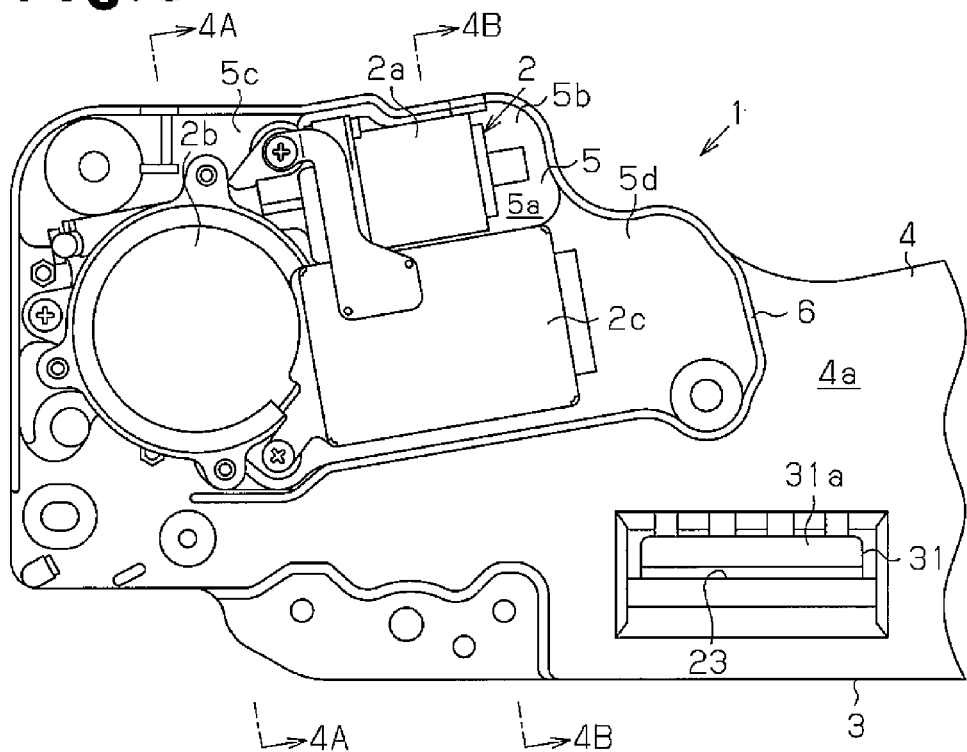
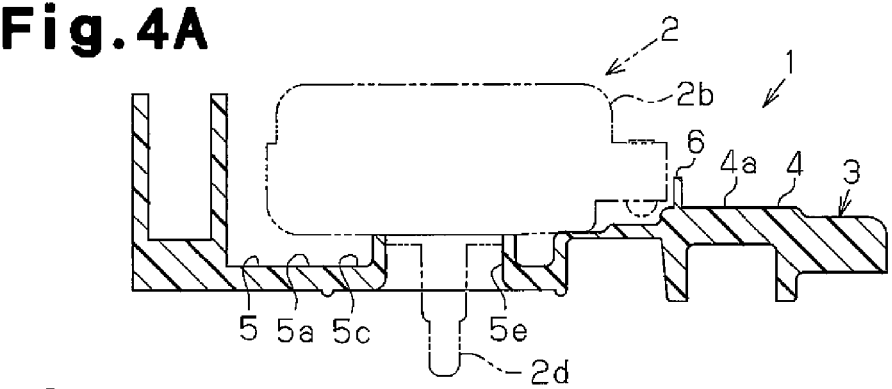
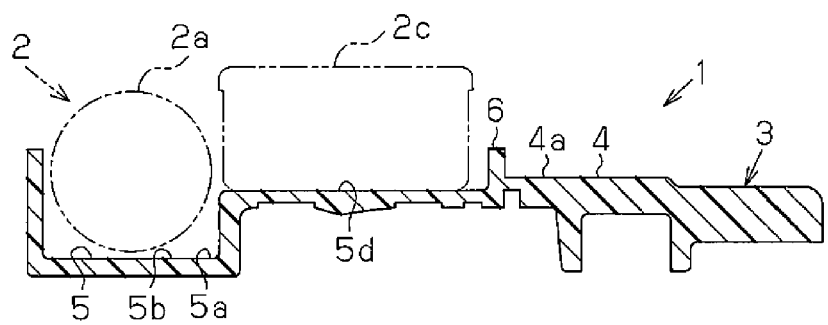

STEP UNIT

FIELD OF THE INVENTION

The present invention relates to a step unit, which includes a step member adjacent to a vehicle sliding door.

BACKGROUND OF THE INVENTION

Conventionally, a step unit is provided on a vehicle main body to be adjacent to a vehicle sliding door thereof. For example, referring to Non-Patent Document 1, a step unit includes a step member (step) and a rail plate member. A lower rail extending in the opening-closing direction of a vehicle sliding door is provided on the lower surface of the step member. The lower rail supports rollers coupled to the sliding door, so that the rollers and the sliding door are guided along the lower rail. Such a step unit has a cutout portion formed in a part of the lower rail. With the rail plate member (sliding door lower rail plate) removed, the cutout portion allows rollers to be supported by the lower rail or to be removed from the lower rail.

PRIOR ART DOCUMENT

Non-Patent Document
Non-Patent Document 1
Repair Manual for TOYOTA ALPHARD VELLFIRE, volume F, May 2008 (DH-282 through DH-285, DH-246, DH-247 and other pages)

SUMMARY OF THE INVENTION

In the above described step unit, the step member and the fastening piece formed by bending the rail plate member each have a fastening hole, and the step member and the rail plate member are assembled together by a bolt passed through the fastening holes. However, to arrange these members of the step unit such that the fastening holes match each other, the rail plate member needs to be held underneath the step member in by touch. This complicates the assembling process.

Further, in the above described step unit, the rail plate member receives a great load from the rollers, and the lower rail has a low rigidity because of its discontinuous structure on the ends of the cutout portion. The rail plate therefore has a complicated shape. That is, a typical rail plate member is formed by welding two metal sheets together, such that one of the sheets protrudes to be flush with the inner surface of the lower rail. A typical rail plate member also has a structure for reinforcing the ends of the cutout portion of the lower rail. The rail plate member has such a complicated structure.

Accordingly, it is an objective of the present invention to provide a step unit that facilitates the assembly and simplifies the shape of a rail plate member.

To achieve the foregoing objective and in accordance with one aspect of the present invention, a step unit including a step member and rail plate is provided. The step member is provided on a vehicle main body to be adjacent to a vehicle sliding door. The step member has, on a lower surface thereof, a pair of lower rails extending in an opening-closing direction of the sliding door. The rail plate member is arranged at a cutout portion, which is formed in a part of one of the lower rails. The rail plate member makes the lower rail continuous in the opening-closing direction. Rollers are coupled to the sliding door and arranged between the pair of lower rails. The rollers, together with the sliding door, are guided by the lower rails in the opening-closing direction. The step member is molded of a plastic material and has an insertion slit and a support extension, the insertion slit extending through the step member in the vertical direction at a position that corresponds to the cutout portion. The support extension extends from an end of the cutout portion of the lower rail to support the rail plate member against load applied to the rail plate member by the rollers. The rail plate member is assembled to the step member by being inserted through the insertion slit from above the step member.

BRIEF DESCRIPTION OF THE DRAWINGS

FIG. 3 is a partial plan view illustrating the step unit shown in FIG. 1;

FIG. 4A is a cross-sectional view taken along line 4A-4A of FIG. 3;

FIG. 4B is a cross-sectional view taken along line 4B-4B of FIG. 3;

DETAILED DESCRIPTION OF THE PREFERRED EMBODIMENTS

One embodiment of the present invention will now be described with reference to FIGS. 1 to 9.

Figure 1:
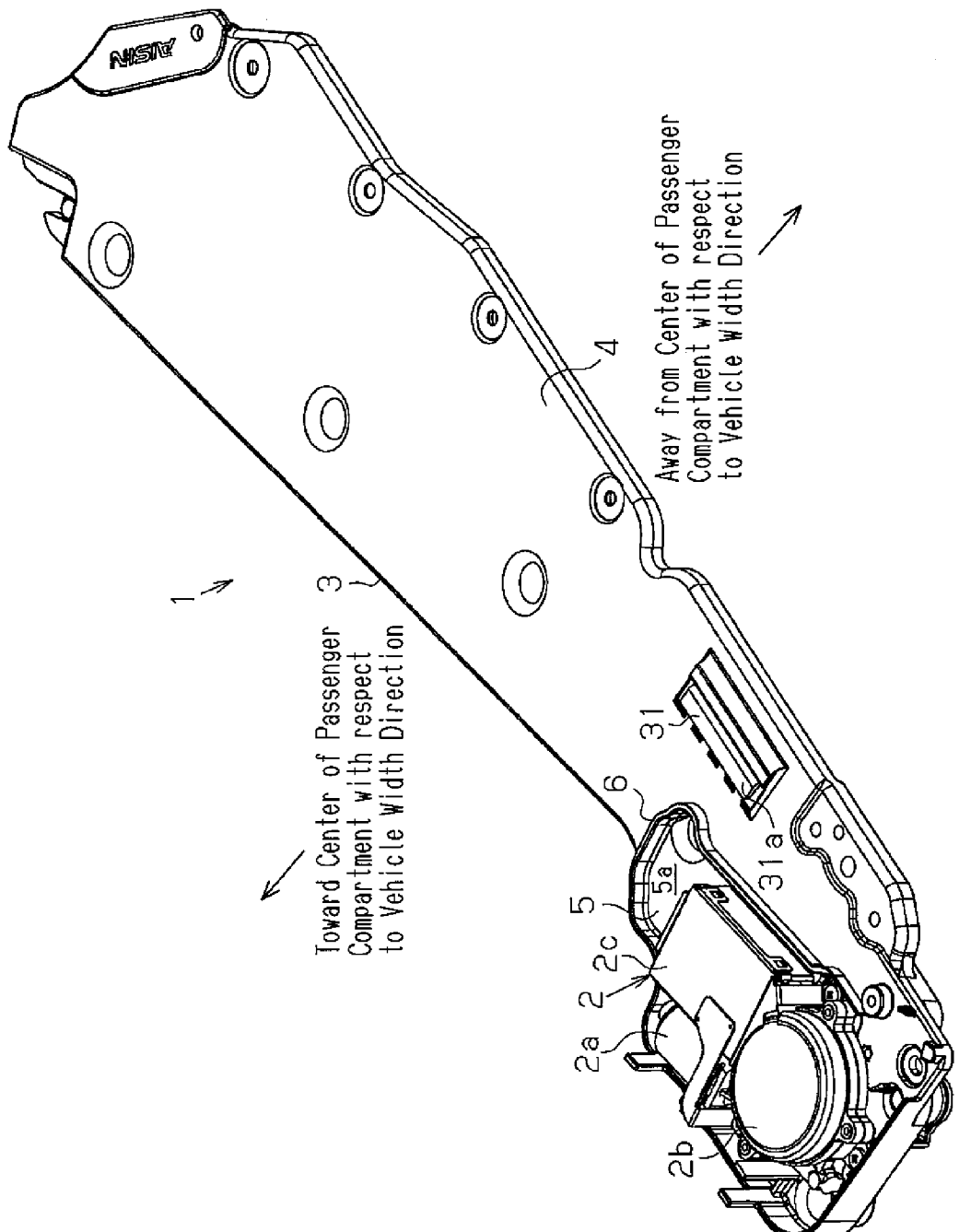
FIG. 1 is a perspective view from above illustrating a step unit according to one embodiment of the present invention.

A vehicle has a step unit 1 shown in FIG. 1, which is located adjacent to a vehicle sliding door (not shown).

As shown in FIG. 1, the step unit 1 of the present embodiment is formed mainly by a drive device (motor unit) 2 for opening and closing the sliding door and a substantially plate-like step member (step) 3. The step unit 1 is fixed to the main body (not shown) of the vehicle. The entire upper surface of the step unit 1 is covered with an unillustrated thin scuff plate (decorative member). The upper surface of the drive device 2 (the lower surface of the thin plate-like scuff plate) is covered with an unillustrated rigid plate (cover).

The step member 3 is formed by molding a plastic material. The step member 3 is located in the passenger compartment at a position adjacent to the sliding door in the closed state, and includes a flat plate portion 4, on which an occupant places a foot when getting in or out of the vehicle, and an accommodation portion 5. The accommodation portion 5 is formed continuous to the flat plate portion 4 and is located on a side of the flat plate portion 4 in the opening direction of the sliding door, or rearward of the flat plate portion 4. A part of the drive device 2 is fixed and accommodated in the accommodation portion 5.

Specifically, when the step unit 1 is installed in the vehicle, a bottom 5a of the accommodation portion 5 is located at a lower position than an upper surface 4a of the flat plate portion 4 as shown in FIGS. 3, 4A and 4B. The height (depth) of the bottom 5a of the accommodation portion 5 is determined based on the shape of the drive device 2. That is, as shown in FIGS. 1 and 3, the drive device 2 of the present embodiment includes a motor 2a, which is a drive source, an output portion 2b, which is attached to the motor 2a and has a gear and an electromagnetic clutch, a control circuit portion 2c, which is installed in the output portion 2b. As shown in FIGS. 4A and 4B, the accommodation portion 5 includes a motor accommodating section 5b, an output portion accommodating section 5c, and a circuit accommodating section 5d, which correspond to the motor 2a, the output portion 2b, and the control circuit portion 2c, respectively. The drive device 2 is fixed by screws such that it partly contacts the bottom 5a of the accommodation portion 5. That is, a part of the drive device 2 is located lower than the upper surface 4a of the flat plate portion 4. More specifically, one third or more of the entire thickness of the drive device 2 in the vertical direction is located below the upper surface 4a of the flat plate portion 4. In the example shown in FIG. 4B, substantially half the entire thickness is located below the upper surface 4a. Also, a peripheral wall 6 is molded integrally with the step member 3 to encompass (almost the entire circumference of) the accommodation portion 5 as shown in FIGS. 1, 3, and 4. The peripheral wall 6 extends to a position above the upper surface 4a of the flat plate portion 4.

Figure 2:
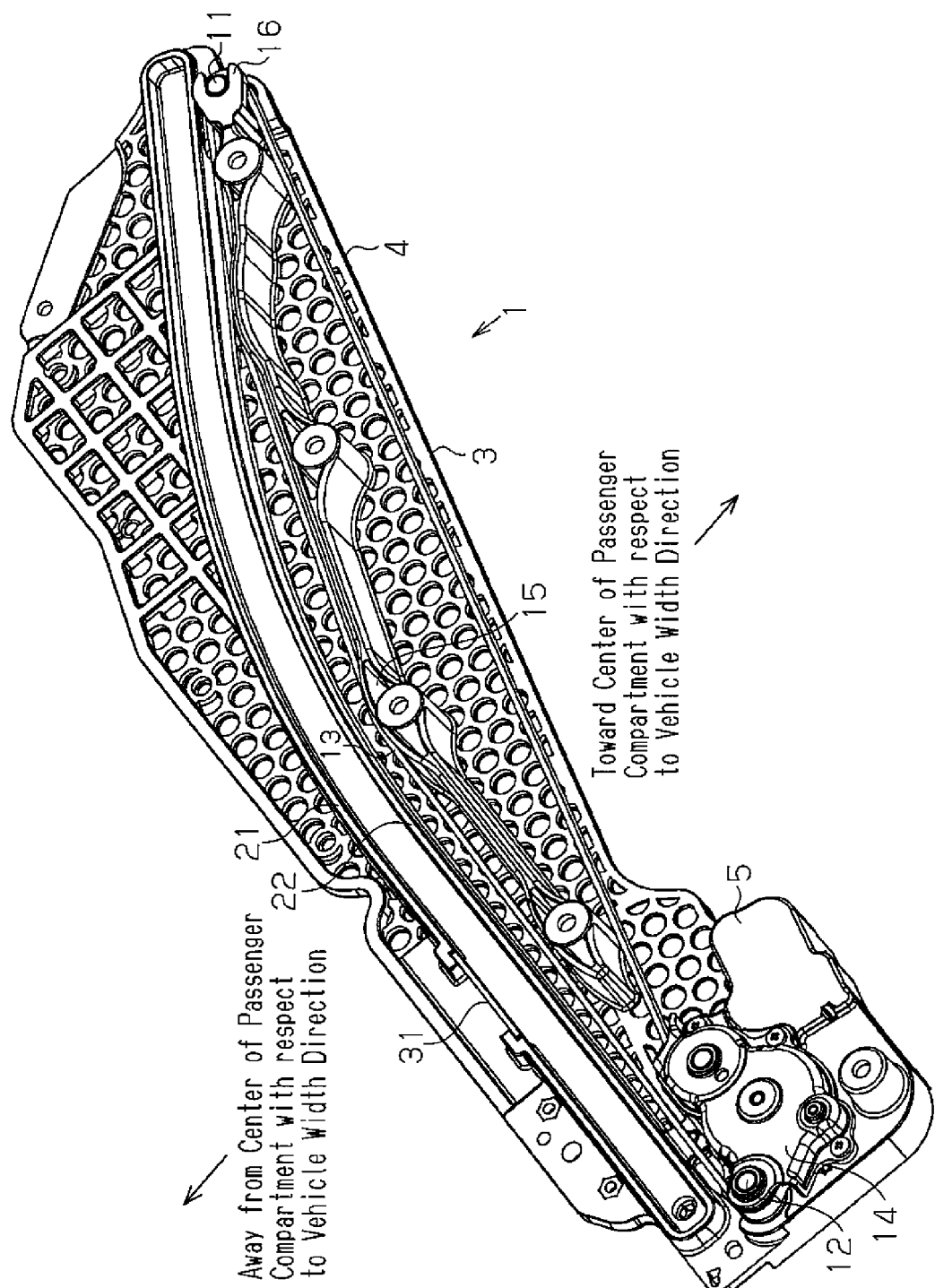
FIG. 2 is a perspective view from below illustrating the step unit shown in FIG. 1.

As shown in FIG. 2, pulleys 11, 12 are located on the lower surface of the step member 3. A loop belt 13 is rotationally supported by the pulleys 11, 12 and substantially extends in the opening-closing direction of the sliding door. The drive device 2 is configured to cause the belt 13 to rotate. That is, as shown in FIG. 4A, an output shaft 2d of the output portion 2b of the drive device 2 extends through a through hole 5e formed in the bottom 5a of the accommodation portion 5 and protrudes from the lower surface of the step member 3. The output shaft 2d transmits power that is output by the drive device 2 to the belt 13 via a power transmitting portion 14 (see FIG. 2), which is provided on the lower surface of the step member 3, thereby rotating the belt 13. In the present embodiment, the opening-closing direction of the sliding door substantially corresponds to the front-rear direction of the vehicle. The position of the belt 13 is regulated by the pulleys 11, 12, which are located at ends of the step member 3 in the vehicle front-rear direction, and a regulation portion 15, which is located between the pulleys 11 and 12 and extends from the lower surface of the step member 3. The regulation portion 15 is molded integrally with the lower surface of the step member 3.

Figure 5:
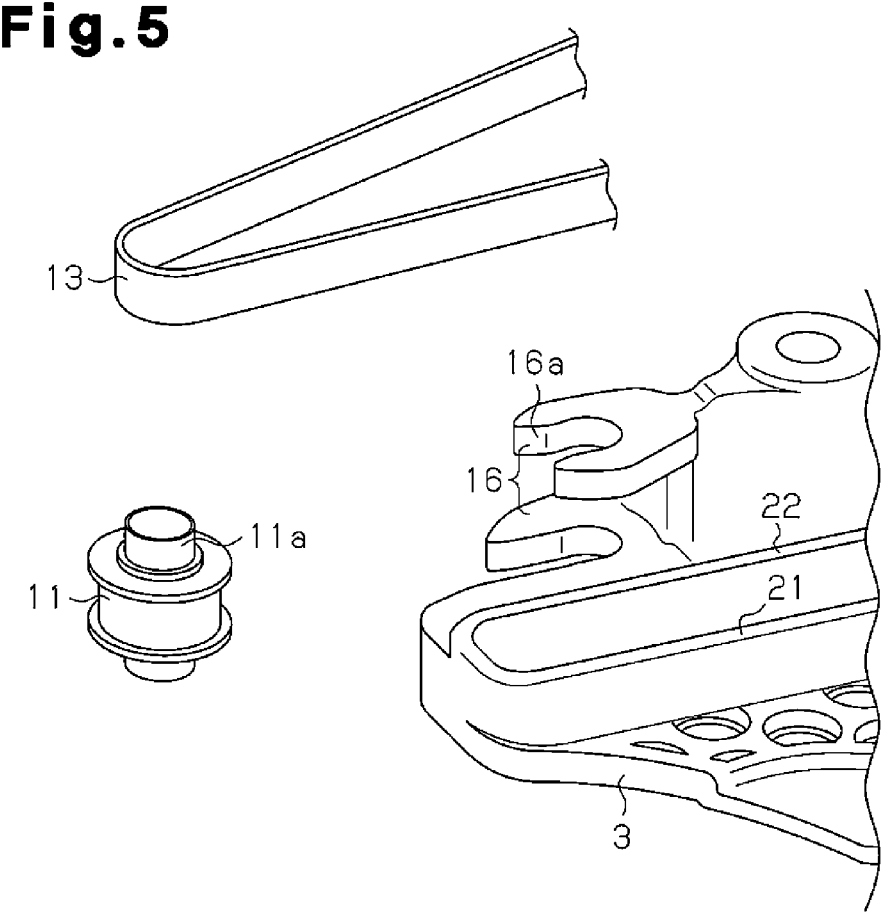
FIG. 5 is an exploded perspective view illustrating the pulley and the structure for supporting the pulley shown in FIG. 2.
Figure 6:
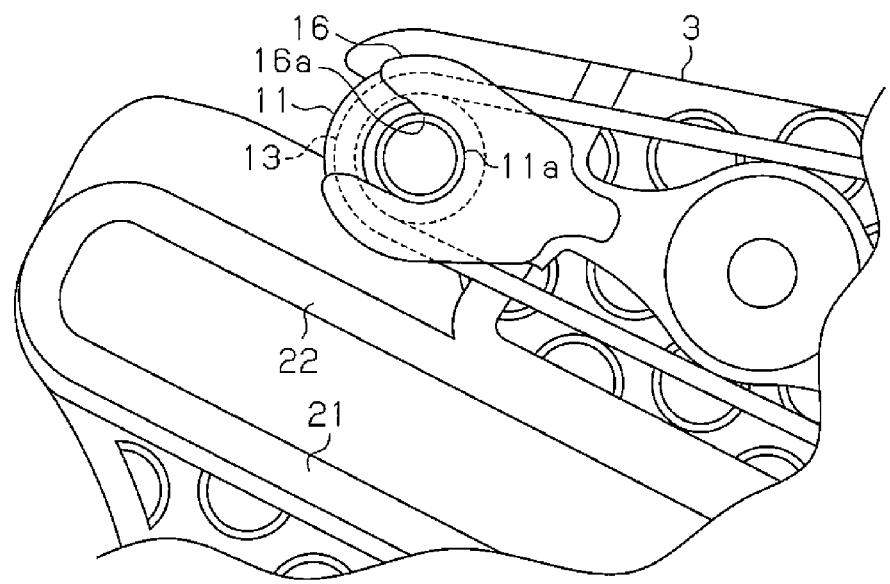
FIG. 6 is a partial bottom view illustrating the pulley and the structure for supporting the pulley shown in FIG. 2.

A pair of non-annular shaft support portions 16, which serve as a shaft support portion, are molded integrally with the step member 3. The pulley 11, which is located at the front end of the step member 3, is supported by the non-annular shaft support portions 16 as shown in FIGS. 5 and 6. The non-annular shaft support portions 16 are formed to engage with and rotationally support the pulley 11. Specifically, the non-annular shaft support portions 16 are separated in the vertical direction, and each have an opening 16a, which opens in a direction opposite to the direction of the force that is perpendicular to the axis and applied to the pulley 11 by the belt 13 in a taut state (in other words, the openings 16a open substantially in the forward direction of the vehicle). A shaft 11a of the pulley 11 is inserted in the non-annular shaft support portions 16 via the openings 16a. Accordingly, the pulley 11 is fitted to and rotationally supported by the non-annular shaft support portions 16. The width of the openings 16a is slightly smaller than the diameter of the shaft 11a of the pulley 11. Therefore, the pulley 11, which is fitted in the non-annular shaft support portions 16, is supported by the non-annular shaft support portions 16, so as not to fall off from the openings 16a unless it receives a force of a certain magnitude. The pulley 12, which is located at the rear end of the step member 3, is rotationally supported by the cover of the power transmitting portion 14 as shown in FIG. 2.

Figure 7:
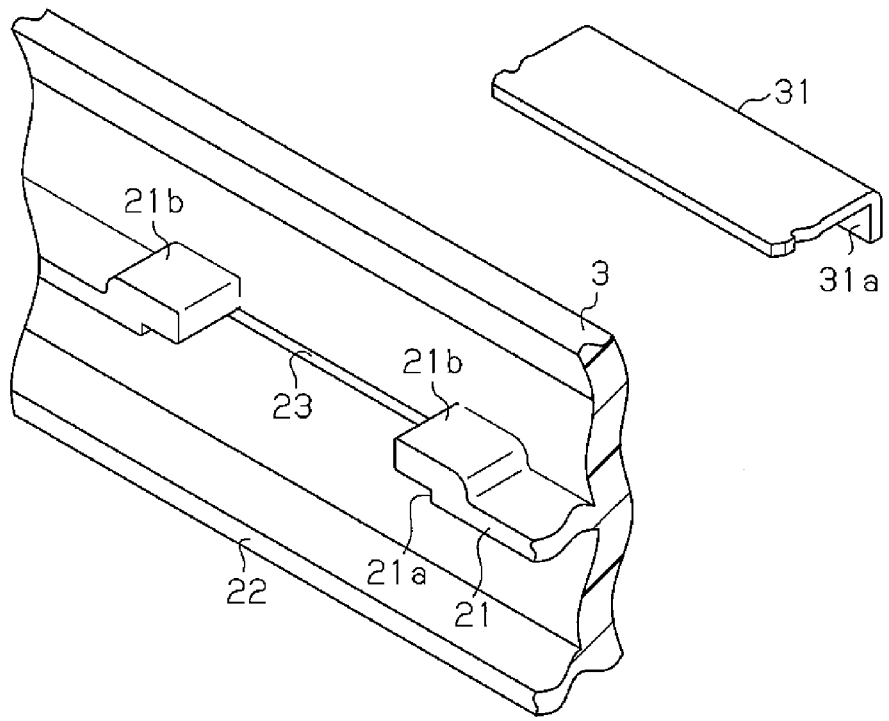
FIG. 7 is an explanatory exploded perspective view from below illustrating the support extensions and the rail plate member in the step unit shown in FIG. 1.
Figure 8:
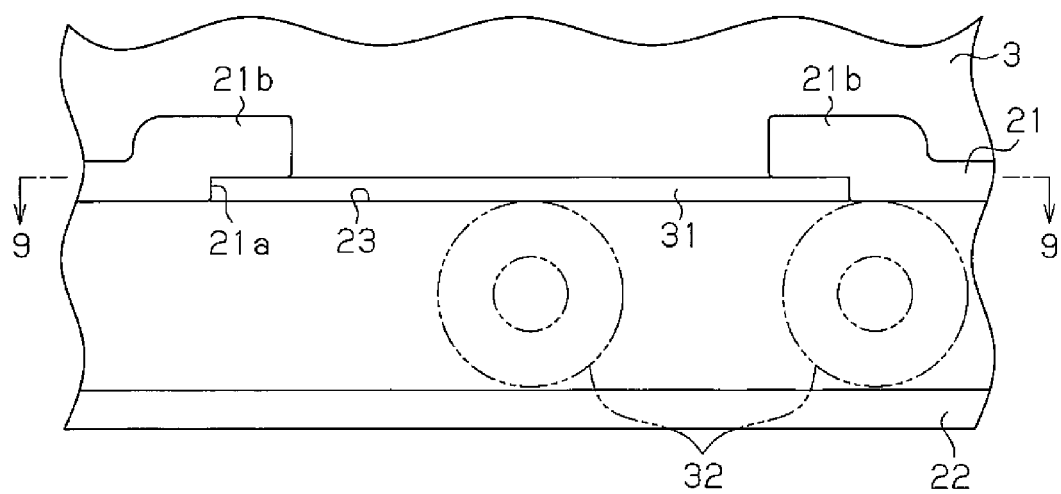
FIG. 8 is a partial bottom view showing the step unit shown in FIG. 1.

A pair of lower rails 21, 22 is molded integrally with the lower surface of the step member 3 as shown in FIG. 2. The lower rails 21, 22 extend in the opening-closing direction of the vehicle sliding door (substantially, the front-rear direction of the vehicle). In the present embodiment, the lower rails 21, 22 are curved inward toward the center of the passenger compartment at a front portion. The lower rails 21, 22 are connected to each other at both ends in the longitudinal direction. As shown in FIGS. 7 and 8, a cutout portion 21a is formed in one of the lower rails, that is, in a part of the lower rail 21. A rail plate member 31 is arranged at the cutout portion 21a to make the lower rail 21 continuous in the opening-closing direction of the sliding door (substantially, in the front-rear direction of the vehicle). Rollers 32 (see FIG. 8) are supported to roll between the lower rails 21, 22 (including the rail plate member 31). The rollers 32 are coupled to the sliding door, for example, via brackets (not shown). Thus, the rollers 32 and the sliding door are guided in the opening-closing direction by the lower rails 21, 22. The rollers 32 are coupled to the belt 13 via brackets (not shown), so that, as the belt 13 rotates, the rollers 32 are moved in the opening-closing direction (while being guided by the lower rails 21, 22).

Figure 9:
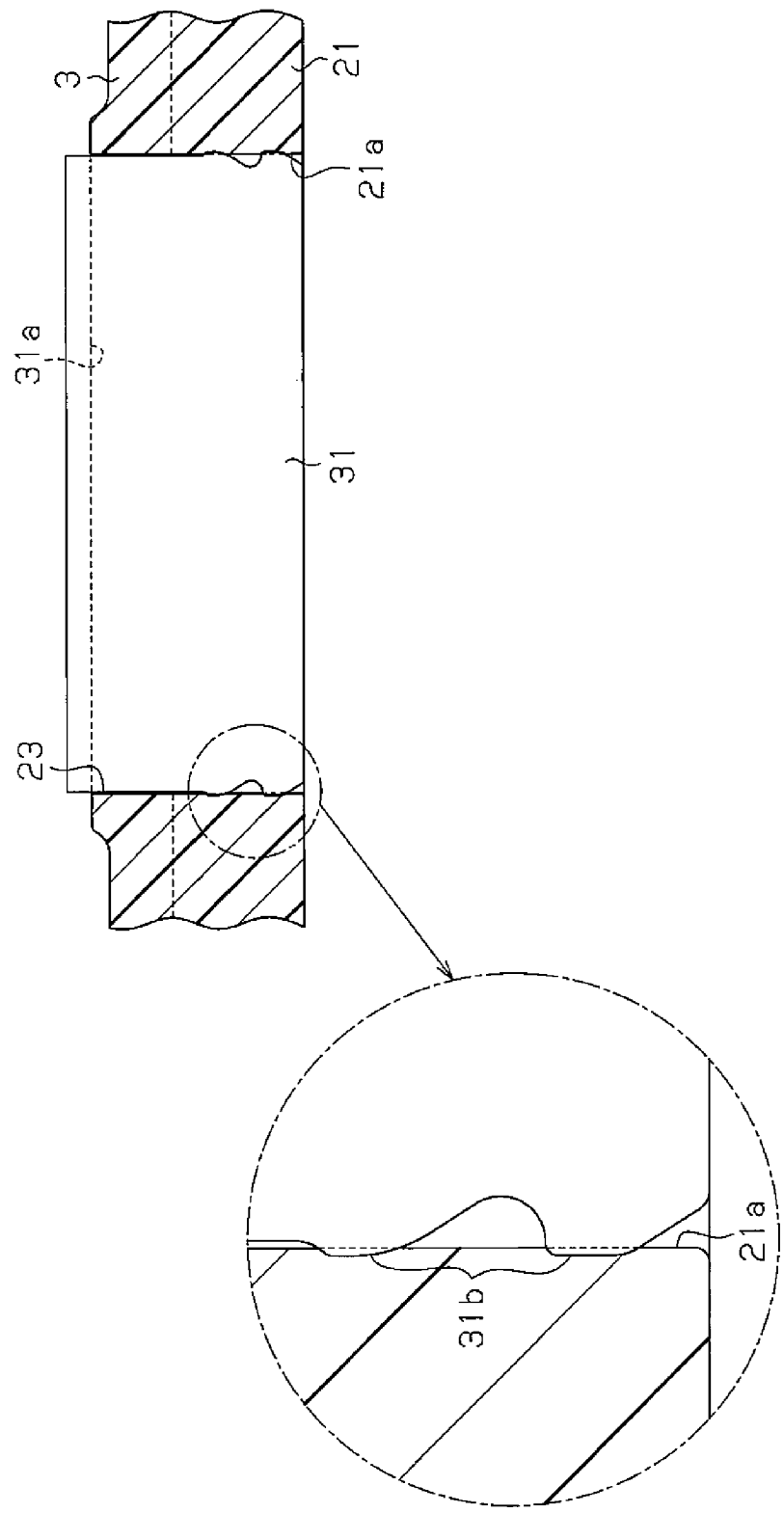
FIG. 9 is a cross-sectional view taken along line 9-9 of FIG. 8.

Specifically, as shown in FIGS. 7 to 9, the step member 3 has an insertion slit 23 extending through the step member 3 in the vertical direction at a position that corresponds to the cutout portion 21a. Also, the step member 3 has a pair of support extensions 21b. The support extensions 21b extend from the ends of the cutout portion 21a of the lower rail 21 to support the rail plate member 31 against the load applied to the rail plate member 31 by the rollers 32 (see FIG. 8). As shown in FIG. 8, the pair of support extensions 21b extend from the ends of the cutout portion 21a of the lower rail 21 in the direction in which load is applied (upward as viewed in FIG. 8, and toward the outside with respect to the vehicle width direction), and extend toward each other without being connected to each other (so that there is a space therebetween). Also, the support extensions 21b are thicker than the lower rail 21 in the direction in which the load is applied (the up-side direction as viewed in FIG. 8).

The rail plate member 31 is installed by being inserted through the insertion slit 23 from above the step member 3 as shown in FIG. 7. The rail plate member 31 is formed by processing a metal plate. As shown in FIGS. 1 and 7, the rail plate member 31 has an angled portion 31a at the upper edge (the upper edge in a state after being installed). The angled portion 31a extends in a direction perpendicular to the vertical direction, or into the passenger compartment with respect to the vehicle width direction in the present embodiment. The rail plate member 31 is assembled with the step member 3 by being inserted into the insertion slit 23 such that the lower side of the angled portion 31a contacts the upper surface of the step member 3. The rail plate member 31 is fixed to the step member 3 through press-fitting as shown in FIG. 9. Specifically, the rail plate member 31 has a pair of press-fit portions 31b on both sides. The press-fit portions 31b slightly protrude sideways and are spaced from each other in the vertical direction to be pressed against the ends of the cutout portion 21a of the lower rail 21. When the rail plate member 31 is inserted through the insertion slit 23 from above the step member 3, the press-fit portions 31b are pressed against the ends of the cutout portion 21a of the lower rail 21. At this time, the sides of the cutout portion 21a may be slightly shaven or elastically deformed by the press-fit portions 31b.

In the above described configuration, the rail plate member 31 can be removed to insert rollers 32 into the space between the lower rails 21, 22 through the cutout portion 21a or remove the rollers 32 from the space between the lower rails 21, 22. When the drive device 2 is operated, the belt 13 is rotated. Accordingly, the rollers 32 are moved while being guided by the lower rails 21, 22, and the sliding door is operated to open or close. The output shaft 2d of the drive device 2 or the housing of the drive device 2 has an seal ring, which is not shown, so that water is completely or almost completely prevented from entering the interior of the drive device 2 or the bottom 5a of the accommodation portion 5 through the through hole 5e formed in the bottom 5a of the accommodation portion 5.

The present embodiment has the following advantages.

(1) The step member 3 has an insertion slit 23 extending through the step member 3 in the vertical direction at a position that corresponds to the cutout portion 21a, which is formed in a part of the lower rail 21. The rail plate member 31 is installed by being inserted through the insertion slit 23 from above the step member 3. This configuration facilitates the assembly process. Also, the step member 3 has a pair of support extensions 21b, which extends from the ends of the cutout portion 21a of the lower rail 21 to support the rail plate member 31 against the load applied to the rail plate member 31 by the rollers 32. Accordingly, the rail plate member 31 is prevented from being deformed by the load applied by the rollers 32. Further, since the support extensions 21b extend from the ends of the cutout portion 21a, the rigidity of the ends of the cutout portion 21a is increased. This eliminates the need for providing, the rail plate member 31 with a structure for reinforcing the ends of the cutout portion 21a. Therefore, the shape of the rail plate member 31 can be simplified as in the present embodiment, in which the rail plate member 31 is formed by a single plate (metal plate), for example. Further, if a part of a rail plate member is caused to protrude such that it is flush with the inner surface of a lower rail (the surface that contacts rollers) as in the conventional art, the corners of that part will be rounded. Accordingly, steps are likely to be formed between the ends of the cutout portion of the lower rail and the rail plate member. In the present embodiment, the rail plate member 31 does not need to be molded to protrude. Therefore, it is easy to prevent such steps from being formed. This contributes to smooth movement of the rollers 32 and the sliding door. Further, unlike conventional step members that are formed through sheet-metal processing, the step member 3 is formed through molding a plastic material. This allows the step member 3 to have wide variety of shapes. Accordingly, for example, the support extensions 21b can be easily molded integrally with the step member 3.

(2) Since the rail plate member 31 is fixed to the step member 3 through press-fitting, fasteners such as bolts and rivets are not necessary. The number of components of the step unit is thus reduced.

(3) Since the rail plate member 31 is press fitted in the insertion slit 23 to be pressed against the ends of the cutout portion 21a of the lower rail 21, steps between the ends of the cutout portion 21a and the rail plate member 31 are further reduced. Therefore, it is possible to directly suppress chattering of the rail plate member 31 in the opening-closing direction of the sliding door, that is, the direction of movement of the rollers 32.

(4) The angled portion 31a, which extends in a direction perpendicular to the vertical direction, is provided at the upper end of the rail plate member 31. The angled portion 31a reliably prevents the rail plate member 31 from fall off (the insertion slit 23 of) the step member 3. Also, with the rail plate member 31 assembled with the step member 3, the rail plate member 31 can be easily detached from the step member 3 by pushing the lower surface of the angled portion 31a upward, for example, with a jig.

(5) The pair of support extensions 21b extend from the ends of the cutout portion 21a of the lower rail 21 in the direction in which load is applied (upward as viewed in FIG. 8) and, extend toward each other. In this case, when arranging the rollers 32 in the space between the lower rails 21, 22 through the cutout portion 21a, the support extensions 21b do not hamper the operation. In addition, since both ends of the rail plate member 31 are supported by the support extensions 21b, the rigidity of the rail plate member 31 against load applied by the roller 32 is improved compared to a case in which only one end of the rail plate member 31 is supported. Also, the rigidity of the ends of the cutout portion 21a is increased. In the above described configuration, the rail plate member 31 can be easily pushed upward manually or with a jig by utilizing the space between the support extensions 21b. The rail plate member 31 thus can be easily removed.

(6) Since the support extensions 21b are thicker than the lower rail 21 in the direction in which the load is applied (the up-down direction as viewed in FIG. 8), the rail plate member 31 can be firmly supported, while achieving the advantage of the item (5).

The above described embodiment may be modified as follows.

In the above described embodiment, the rail plate member 31 is fixed to the step member 3 through press-fitting. However, the rail plate member 31 may be fixed through other configuration. For example, the rail plate member 31 may be fixed to the step member 3 by using fasteners such as bolts or rivets. In this case, for example, the rail plate member 31 may be fixed by the angled portion 31a and a fastener that is passed through the step member 3. To prevent the fastener from interfering with the rollers 32, the angled portion 31a is preferably fixed such that it extends in a direction away from the pair of lower rails 21, 22 (toward the outside of the passenger compartment with respect to the vehicle width direction). In the above described embodiment, the rail plate member 31 is press fitted to be pressed against the ends of the cutout portion 21a of the lower rail 21. However, the rail plate member 31 may be press fitted to be pressed in the vehicle width direction (up-down direction as viewed in FIG. 8).

In the above described embodiment, the angled portion 31a, which extends in a direction perpendicular to the vertical direction, is provided at the upper end of the rail plate member 31. However, the present invention is not limited to this, and a rail plate member that does not have the angled portion 31a may be used. In such a case, for example, the support extensions 21b of the step member 3 may have a bottom for preventing the rail plate member from falling off (preferably through integral molding).

In the above illustrated embodiment, the pair of support extensions 21b extend from the ends of the cutout portion 21a of the lower rail 21 in the direction in which load is applied (upward as viewed in FIG. 8), and extend toward each other. However, a support extension 21b may be formed only at one of the ends of the cutout portion 21a.

In the above described embodiment, the rail plate member 31 is formed by processing a metal plate. However, the rail plate member 31 may be formed, for example, through molding plastic.

In the above described embodiment, the step unit 1 includes the drive device (motor unit) 2 for opening and closing a vehicle sliding door. However, the step unit 1 does not necessarily include the drive device 2. That is, a step member that does not include the accommodation portion 5 may be used. In this case, the pulleys 11, 12, the belt 13 and the power transmitting portion 14 are not necessary.

Description Of The Reference Numerals

3 . . . Step Member, 21, 22 . . . Lower Rails, 21a . . . Cutout Portion, 21b . . . Support Extensions, 23 . . . Insertion Slit, 31 . . . Rail Plate Member, 31a . . . Angled Portion, 32 . . . Rollers.

The invention claimed is:

1. A step unit comprising:
a step member that is provided on a vehicle main body to be adjacent to a vehicle sliding door, the step member having, on a lower surface thereof, a pair of lower rails extending in an opening-closing direction of the sliding door; and
a rail plate member arranged at a cutout portion, which is formed in a part of one of the lower rails, the rail plate member making the lower rail continuous in the opening-closing direction, wherein
rollers are coupled to the sliding door and arranged between the pair of lower rails, the rollers, together with the sliding door, being guided by the lower rails in the opening-closing direction,
the step member is molded of a plastic material and has an insertion slit and a support extension, the insertion slit extending through the step member in the vertical direction at a position that corresponds to the cutout portion, and the support extension extending from an end of the cutout portion of the lower rail to support the rail plate member against load applied to the rail plate member by the rollers, and
the rail plate member is assembled to the step member by being inserted through the insertion slit from above the step member.

2. The step unit according to claim 1, wherein the rail plate member is fixed to the step member through press-fitting.

3. The step unit according to claim 2, wherein the rail plate member is press-fitted so that it is pressed against the end of the cutout portion of the lower rail.

4. The step unit according to claim 1, wherein the rail plate member has an angled portion at the upper edge, the angled portion extending in a direction perpendicular to the vertical direction.

5. The step unit according to claim 1, wherein the support extension is one of a pair of support extensions, which extend from the ends of the cutout portion of the lower rail in the direction that the load is applied and which extend toward each other.

6. The step unit according to claim 5, wherein the support extensions are thicker than the lower rail in the direction that the load is applied.

* * * * *